United States Patent
Kato et al.

(10) Patent No.: US 10,116,126 B2
(45) Date of Patent: Oct. 30, 2018

(54) OUTDOOR UNIT OF AIR CONDITIONER

(71) Applicant: Hitachi-Johnson Controls Air Conditioning, Inc., Tokyo (JP)

(72) Inventors: Fumihiro Kato, Tokyo (JP); Atsuhiko Fukasawa, Tokyo (JP); Tetsuya Kozai, Tokyo (JP); Yuta Oikawa, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 15/919,533

(22) Filed: Mar. 13, 2018

(65) Prior Publication Data
US 2018/0269669 A1    Sep. 20, 2018

(30) Foreign Application Priority Data

Mar. 14, 2017  (JP) .................................. 2017-048209

(51) Int. Cl.
*H02G 3/08*  (2006.01)
*F24F 1/56*  (2011.01)
*F24F 1/22*  (2011.01)

(52) U.S. Cl.
CPC .............. *H02G 3/081* (2013.01); *F24F 1/22* (2013.01); *F24F 1/56* (2013.01); *F24F 2221/32* (2013.01)

(58) Field of Classification Search
None
See application file for complete search history.

(56) References Cited

U.S. PATENT DOCUMENTS

| | | | | |
|---|---|---|---|---|
| 7,049,516 B1* | 5/2006 | Haag | ........................ | H02B 1/38 174/481 |
| 7,558,052 B1* | 7/2009 | Coomer | ................. | H02B 11/02 200/306 |
| 7,952,042 B2* | 5/2011 | Coomer | ................. | H02B 11/02 200/293 |
| 9,819,159 B2* | 11/2017 | Smith | ...................... | H02B 1/56 |
| 2006/0233355 A1* | 10/2006 | Markiewicz | ......... | H04M 1/0293 379/413.04 |
| 2014/0083734 A1* | 3/2014 | Magno, Jr. | ........... | H05K 5/0221 174/50 |
| 2016/0359307 A1* | 12/2016 | Vezina | ................. | G01R 22/065 |

FOREIGN PATENT DOCUMENTS

JP          5669650 B2    2/2015

* cited by examiner

*Primary Examiner* — Dimary Lopez Cruz
(74) *Attorney, Agent, or Firm* — Mattingly & Malur, PC

(57) ABSTRACT

An outdoor unit of an air conditioner is provided that improves work efficiency at the time of installation and maintenance of the outdoor unit and prevents a cover for covering an opening from being unintentionally left open. The outdoor unit of the air conditioner includes an electrical box, a housing that covers the electrical box to form an contour, an electrical box cover member that covers components inside the electrical box, a housing cover that covers the electrical box cover member from outside, wherein the electrical box cover member has a work opening and has an opening cover that covers the work opening mounted thereon, and in which the housing cover abuts on the opening cover in a state of the opening cover being open.

7 Claims, 7 Drawing Sheets

REAR
LEFT ← → RIGHT
FRONT

OUTDOOR UNIT OF AIR CONDITIONER

The present application claims priority under 35 U.S.C § 119 to Japanese patent Application No. 2017-048209, filed on Mar. 14, 2017, the disclosures are incorporated herein by reference in their entireties.

TECHNICAL FIELD

The present invention relates to an outdoor unit of an air conditioner.

BACKGROUD ART

Conventionally, in an outdoor unit of a commercial air conditioner, a control board is stored in an electrical box, the electrical box is covered with an electrical box cover, and further the electrical box is covered with a housing cover forming a contour thereof. The housing cover is a product design face.

The control board includes a DIP switch required to be set onsite where the air conditioner is installed and a seven segment LED that is used for confirming light emission at the time of service to know a product status or the like.

For example, an outdoor unit of an air conditioner described in Japanese Patent No. 5669650 includes an electrical component box that houses control parts.

SUMMARY OF THE INVENTION

Problems to be Solved by the Invention

However, the electrical box cover is required to be removed at the time of installation and inspection of the outdoor unit described in Japanese patent No. 5669650. Accordingly, there is a problem that it takes time to perform the installation and inspection of the outdoor unit. Further, a safety standard of a certain country rules that a worker should wear a protective garment when opening an electrical box in an energized state to cause additional troublesomeness.

Additionally, the electrical component box may be provided with a plastic cover, the outside of which is covered with a housing cover. However, this configuration may deteriorate a locking part for closing the plastic cover, and may cause the hosing cover to be closed without covering the electric component box with the plastic cover. In other words, the plastic cover may be left open unintentionally.

As described above, a configuration effective for handling the electrical box at the time of the installation and inspection of the outdoor unit has not been provided yet.

The present invention has been created in view of the above situation. It is the object of the present invention to provide an outdoor unit of an air conditioner that improves work efficiency at the time of installation and maintenance of the outdoor unit and that prevents a lid that covers an opening from being left open unintentionally.

Solution to Problem

In order to solve the above problem, the outdoor unit of the air conditioner according to the first invention includes: an electrical box; a housing that covers the electrical box to form a contour; an electrical box cover member that covers components inside the electrical box; and a housing cover that covers the electrical box cover member from outside. The electrical box cover member has a work opening and is provided with an opening cover that covers the work opening, and the housing cover abuts on the opening cover in a state of the opening cover being open.

The outdoor unit of the air conditioner according to the second invention includes: an electrical box; a housing that covers the electrical box to form an contour, an first lid member attached to the housing; a second lid member mounted on an inner side of the first lid member; a work opening that is opened and closed by the second lid member. If the first lid member is about to be attached to the housing in a state of the second lid member being open, the first lid member abuts on the second lid member, and is prevented from being attached to the housing.

Advantageous Effects of Invention

The present invention provides the outdoor unit of the air conditioner that can improve the work efficiency at the time of installation and maintenance of the outdoor unit and can prevent the lid that covers the opening from being left open unintentionally.

BRIEF DESCRIPTION OF DRAWINGS

The present invention is described in detail below with reference to the attached drawing figures, wherein.

DESCRIPTION OF EMBODIMENTS

Embodiments of the present invention will be described in detail with reference to the drawings as appropriate.

Figure 1:
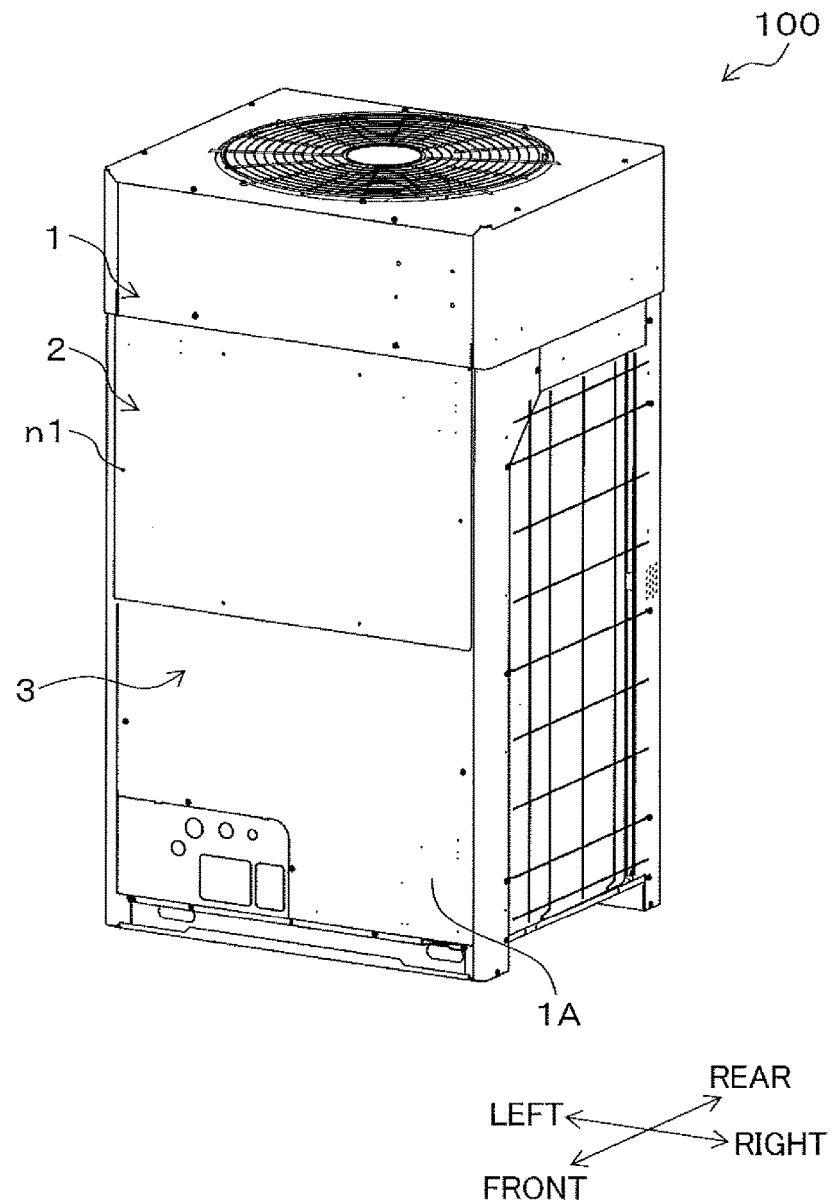
FIG. 1 is a front perspective view, as viewed obliquely from above, of an outdoor unit of an air conditioner according to an embodiment of the present invention.

FIG. 1 is a front perspective view, as viewed obliquely from above, of an outdoor unit 100 of an air conditioner according to an embodiment of the present invention.

The air conditioner of the embodiment has the outdoor unit 100 and an indoor unit (not shown) connected with each other by a refrigerant pipe (not shown). This constitutes a refrigeration cycle to perform air conditioning.

The outdoor unit 100 has a compressor (not shown), a heat exchanger (not shown), a pressure reducing device (not shown), a blower (not shown), and an electrical box (not shown) provided in a housing 1.

The compressor, the heat exchanger, and the pressure reducing device constitutes the refrigeration cycle.

The blower sends air around the heat exchanger of the outdoor unit 100 to the outer space to promote heat exchange.

The electrical box has a control board mounted thereon that controls the outdoor unit 100. The control board has electric components (not shown) mounted thereon such as a display unit and various kinds of switches.

Figure 2:
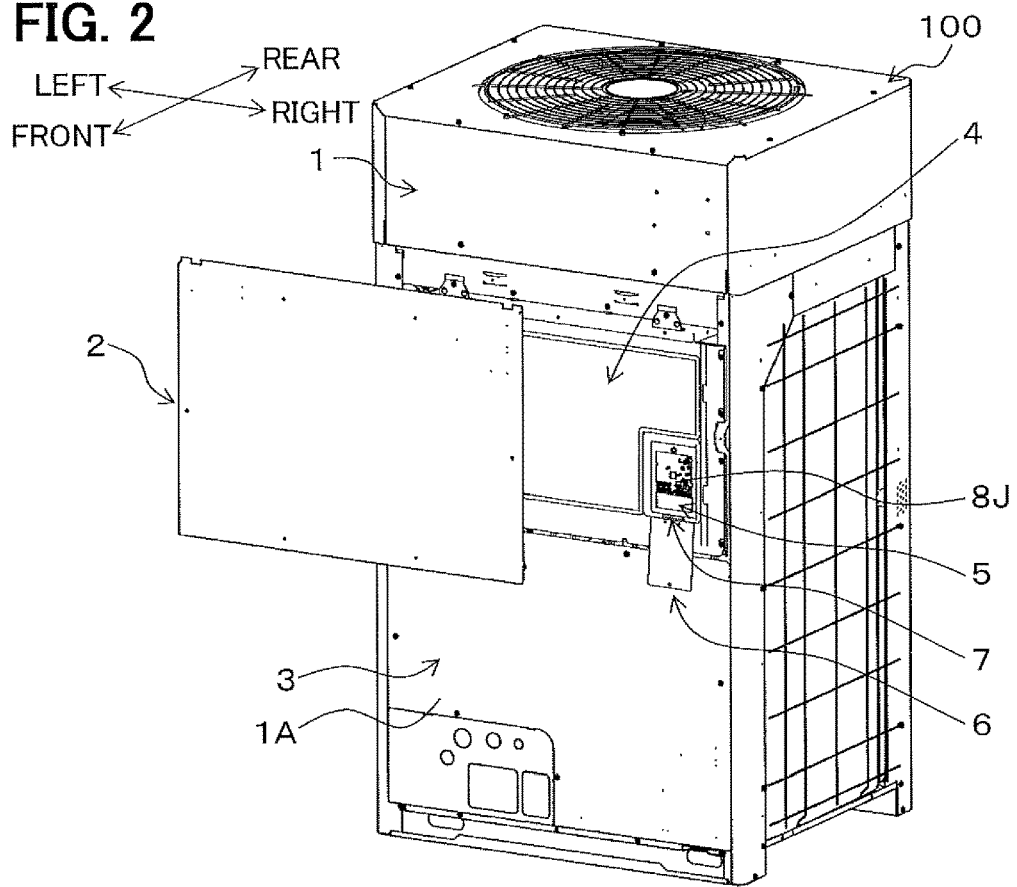
FIG. 2 is a front perspective view, as viewed obliquely from above, of the outdoor unit in a state that a housing cover is removed therefrom and an opening cover lid is opened.

FIG. 2 is a front perspective view, as viewed obliquely from above, of the outdoor unit 100 in a state that a housing cover 2 is removed therefrom and an opening cover lid 6 is opened.

In the lower front part of the outdoor unit 100, a lower cabinet 3 forms the housing 1. In the center front part of the outdoor unit 100, the removable lid-like housing cover 2 is fixed to a front panel 1A of the housing 1 in such a way that the inside of the electrical box can be confirmed at the time of product service. The lower part of the front panel 1A is formed with the lower cabinet 3 and the like.

Figure 3:
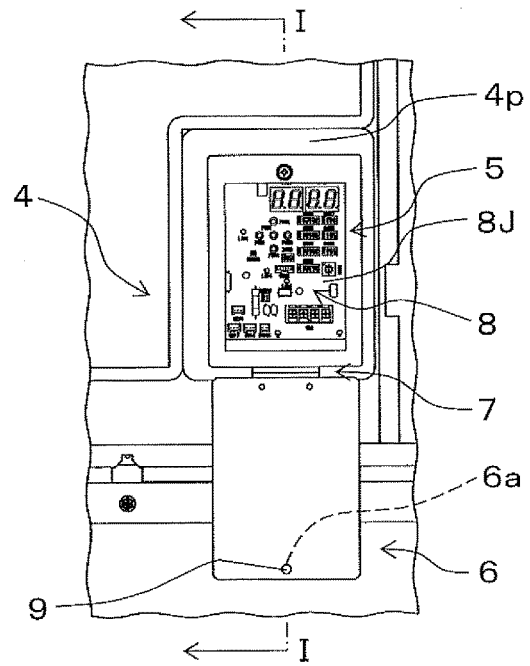
FIG. 3 is a front view obtained by enlarging a periphery of an opening.

The housing cover 2 has an electrical box cover panel 4 that covers the whole electrical box, fixed to the rear thereof. In this manner, the electrical box is covered with the electrical box cover panel 4 to protect a control board 8 (see FIG. 3) and other electric components (not shown). FIG. 3 is a front view obtained by enlarging a periphery of an opening 5.

The electrical box cover panel 4 is disposed on the rear side with respect to the lower cabinet 3 that is a part of the front panel 1A. In other words, the electrical box cover panel 4 is provided so as to be recessed toward the deeper side than the front panel 1A including the lower cabinet 3.

The housing cover 2 has an area large enough to cover the whole electrical box as viewed from front.

The electrical box cover panel 4 has an opening 5 for inspecting electric components of a weak current part 8J provided on the lower right part thereof. This allows for visually observing a part of the control board 8 (the weak current part 8J mounted with weak current components, and the like) arranged inside of the electrical box through the opening 5.

An opening cover lid 6 for opening and closing the opening 5 is mounted on the electrical box cover panel 4. Specifically, the opening cover lid 6 is pivotably supported by a hinge 7 that is provided on the electrical box cover panel 4.

Meanwhile, since the outdoor unit 100 is used outdoors, the outdoor unit 100 is exposed to wind and rain. Thus, the housing 1 of the outdoor unit 100 requires weather resistance and a predetermined strength. Accordingly, the housing 1, the electrical box cover panel 4, and the opening cover lid 6 are made of sheet metal having weather resistance and high strength. Note that, as far as the housing 1, the electrical box cover panel 4, and the opening cover lid 6 have a predetermined weather resistance and strength, materials other than sheet metal may be used.

As described above, the opening cover lid 6 is mounted so as to be freely opened and closed by the hinge 7 of the electrical box cover panel 4. The opening cover lid 6 is rotated around the hinge 7 by 90 degrees or more to be opened downward (see FIG. 2 and FIG. 3). The opening cover lid 6 is opened downward so that a user can visually observe the weak current part 8J of the control board 8 through the opening 5.

The weak current part 8J of the control board 8 is equipped with a DIP switch that is used to set items necessary to be selected at a time of on-site installation or to set functions desired to be operated specially. Further, a seven-segment LED is mounted on the control board 8 in such a way that an operating condition of the air conditioner or the like can be confirmed at the time of service work.

The opening cover lid 6 is opened downward in this way so that the user can visually observe the DIP switch and the seven-segment LED through the opening 5. This allows a serviceman as the user to access the DIP switch and the seven-segment LED without opening the electric cover 4, by opening the opening cover lid 6.

A certain country provides a safety standard to ensure safety of the serviceman for maintenance or the like at the time of work.

According to this safety standard, when the inside of the electrical box of the outdoor unit 100 is operated in an energized state, it is necessary for the serviceman to wear an antistatic overall, rubber gloves, leather gloves, and a helmet with a face protecting shield. It is extensive for the serviceman to change into a protecting garment. Thus, work efficiency is low, leading to increase of work hours. For this reason, changing into the protecting garment is disfavored by the serviceman.

According to the configuration of the present embodiment, the opening cover lid 6 is provided at such a position that the opening 5 through which the weak current part 8J is visually observed can be opened and closed, so that, when the opening cover lid 6 is opened, only the weak current part 8J is exposed through the opening 5.

Accordingly, opening the opening cover lid 6 is only required for performing work to the weak current part 8J, thus wearing the protecting garment is unnecessary.

<Opening Cover Lid 6>

Figure 4:
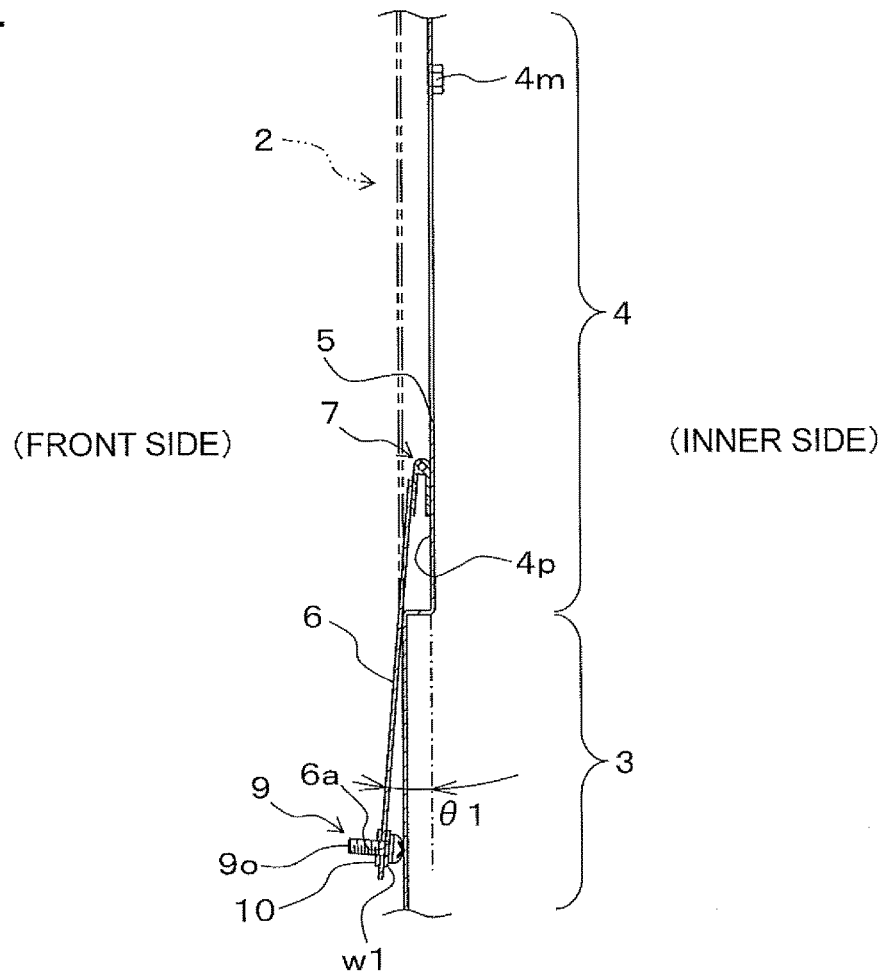
FIG. 4 is a cross sectional view taken along line I-I in FIG. 3 to show a vicinity of the opening cover lid.
Figure 5:
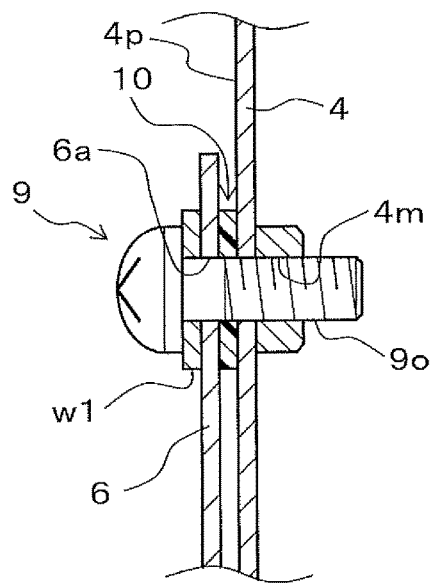
FIG. 5 is a view corresponding to a section taken along line I-I in FIG. 3, obtained by enlarging a periphery of an opening cover fixing screw when the opening is closed by the opening cover lid.

FIG. 4 is a cross sectional view taken along line I-I in FIG. 3 to show a vicinity of the opening cover lid 6. FIG. 5 is a view corresponding to the cross sectional view taken along line I-I in FIG. 3, obtained by enlarging a periphery of an opening cover fixing screw 9 when the opening is closed by the opening cover lid 6.

One end part of the opening cover lid 6 is pivotably supported to the electrical box cover panel 4 through the hinge 7.

Another end of the opening cover lid 6 is provided with a screw insertion hole 6a (see FIG. 4 and FIG. 5) into which the opening cover fixing screw 9 is inserted. The screw insertion hole 6a of the opening cover lid 6 has a screw part 9o of the opening cover fixing screw 9 inserted thereinto through a washer w1. Further, as illustrated in FIG. 4, a sems washer 10 is fitted from the tip side of the screw part 9o close to the opening cover lid 6.

The sems washer 10 is fixed to the screw part 9o of the opening cover fixing screw 9, having the opening cover lid 6 therebetween, so that, as illustrated in FIG. 4, the sems washer serves as a stopper that stops the opening cover fixing screw 9 from coming off the opening cover lid 6, when the opening cover lid 6 is opened. This prevents the opening cover fixing screw 9 from coming off the screw insertion hole 6a of the opening cover lid 6.

Meanwhile, the electrical box cover panel 4 has a female screw 4m formed therein into which the screw part 9o of the opening cover fixing screw 9 is screwed. The female screw 4m may be formed by burring the electrical box cover panel 4, or by welding a cylindrical-shaped component having the female screw 4m formed therein the electrical box cover panel 4. Accordingly, as far as the electrical box cover panel 4 has the female screw 4m formed therein into which the opening cover fixing screw 9 is screwed, any configuration may be selected. When the opening cover lid 6 is opened, the opening cover fixing screw 9 (see FIG. 5) is loosened with the housing cover 2 removed as illustrated in FIG. 2, then the opening cover lid 6 is opened downward (see FIG. 2 and FIG. 3).

At the time of using the outdoor unit, as illustrated in FIG. 5, the opening cover fixing screw 9 attached to the opening cover lid 6 is screwed into the female screw 4m of the electrical box cover 4 to close the opening 5 by the opening cover lid 6. Further, as illustrated in FIG. 1, the housing cover 2 is mounted on the front panel 1A with a fixing screw n1 and the like. Accordingly, the opening 5 is covered doubly by the opening cover lid 6 and the housing cover 2.

<Work to Weak Current Part 8J Through Opening 5>

Figure 6:
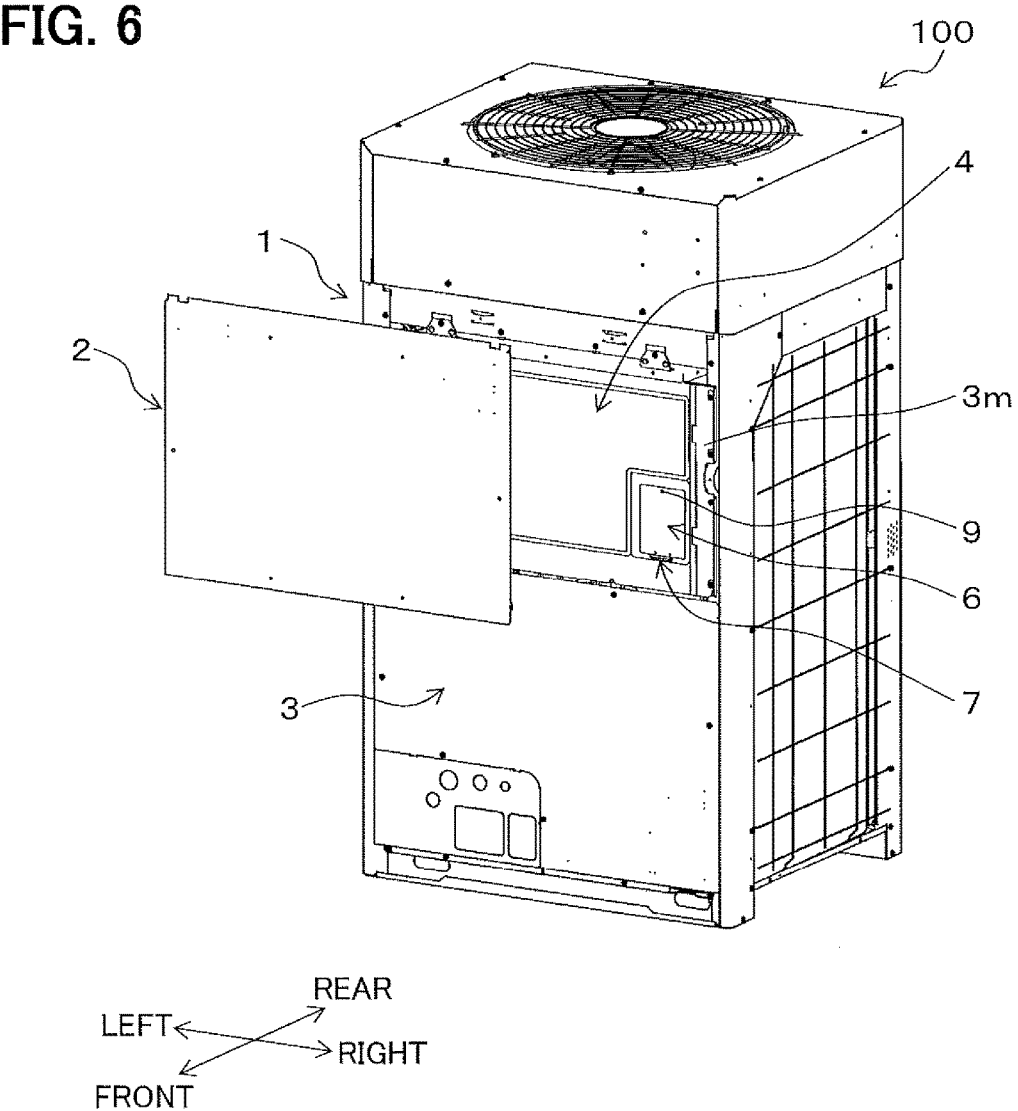
FIG. 6 is a front perspective view, as viewed obliquely from above, of the outdoor unit in a state that the housing cover is removed from the outdoor unit.

FIG. 6 is a front perspective view, as viewed obliquely from above, of the outdoor unit 100 in a state that the housing cover is removed from the outdoor unit 100.

At the time of the installation and maintenance of the outdoor unit 100, the fixing screw n1 on the front side of the outdoor unit 100 (see FIG. 1) is loosened to disengage the upper side of the housing cover 2 so as to have the housing cover 2 removed from the front panel 1A.

Next, the opening cover fixing screw 9 in FIG. 5 is loosened to pivot the opening cover lid 6 by 180 degrees toward the near side so as to be opened, as shown in FIG. 4, to allow the opening 5 to be visually observed from outside.

In such a case, since the opening cover lid 6 contacts the lower cabinet 3 disposed on the front side with respect to the electrical box cover panel 4, the opening cover lid 6 can be only opened at a determined angle θ1, which is 180 degrees or less, to a face 4p to which the electrical box cover panel 4 extends. Accordingly, the opening cover lid 6 projects frontward with respect to the lower cabinet 3.

For this reason, even if the housing cover 2 is about to be closed with the opening cover lid 6 unintentionally left open, the housing cover 2 abuts on the opening cover lid 6 that projects frontward with respect to the lower cabinet 3 to be prevented from being closed. In other words, if the opening cover lid 6 is unintentionally left open, the housing cover 2 is prevented from being closed. This can prevent the opening cover lid 6 from being unintentionally left open.

To implement this configuration, the opening 5 may be provided at a position close to either of the left and right sides or the lower side of the electrical box cover panel 4, and when the opening cover lid 6 is opened, the opening cover lid 6 may be configured to abut on the lower cabinet 3, a right cabinet 3m, or a left cabinet 3h which are disposed on the front side with respect to the electrical box cover panel 4 (The details will be described below).

Note that, when the opening cover lid 6 is opened, the opening cover fixing screw 9 is assumed to be kept attached to the opening cover lid 6. As described above, the sems washer 10 is fixed to the opening cover fixing screw 9 so as to have the opening cover lid 6 therebetween to prevent the screw from falling.

In contrast, if the sems washer 10 is not provided, when the opening cover lid 6 is opened, the opening cover fixing screw 9 may come off from the opening cover lid 6. Accordingly, additional work may be required for the serviceman to search for the opening cover fixing screw 9 may be required.

The sems washer 10 is provided in the present embodiment to eliminate the additional work of searching for the opening cover fixing screw 9.

To summarize the above, the service opening 5 is provided in the weak current part 8J of the electrical box, and the opening cover lid 6 is provided for opening and closing the opening 5. Thereby, it becomes unnecessary for the serviceman to wear the protection garment. This allows for implementing the outdoor unit 100, with a simple structure, that improves the work efficiency for the weak current part 8J.

Further, a configuration is employed in which the housing cover 2 cannot be mounted in a state of the opening cover lid being open to prevent the opening cover lid 6 from being unintentionally left open.

Furthermore, the sems washer 10 is fixed to the opening cover fixing screw 9 which serves as a fastener for the opening cover lid 6 to prevent the opening cover fixing screw 9 from coming off the opening cover lid 6. This eliminates the additional work for the serviceman to search for the opening cover fixing screw 9 after opening the opening cover lid 6. Thus, the work efficiency in handling the electrical box cover can be improved.

<First Modification>

Figure 7:
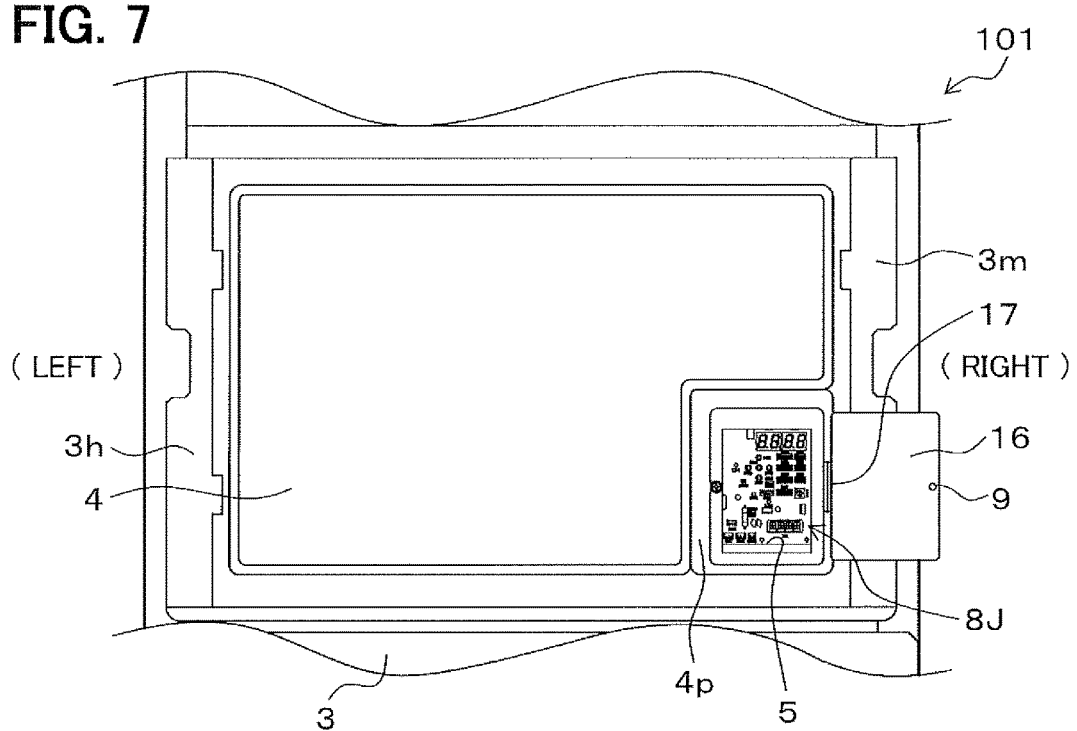
FIG. 7 is a front view of a periphery of an opening of an outdoor unit according to a first modification when an opening cover lid is opened.

FIG. 7 is a front view of the periphery of the opening 5 when an opening cover lid 16 of an outdoor unit 101 is opened according to a first modification.

The outdoor unit 101 of the first modification has a hinge 17 provided at the right edge of the electric cover panel 4 disposed on the rear side with respect to the right cabinet 3m. Further, the outdoor unit 101 has the opening cover lid 16 for opening and closing the opening 5 mounted thereon so as to be horizontally pivotable via the hinge 17.

In such a case, as in the embodiment, the opening cover lid 16 abuts on the right cabinet 3m when an opening cover lid 16 is opened, and thus can be only opened at a predetermined angle, which is 180 degrees or less, to the face 4p to which the electrical box cover panel 4 extends.

Accordingly, it is possible to prevent the opening cover lid 16 from being unintentionally left open.

<Second Modification>

Figure 8:
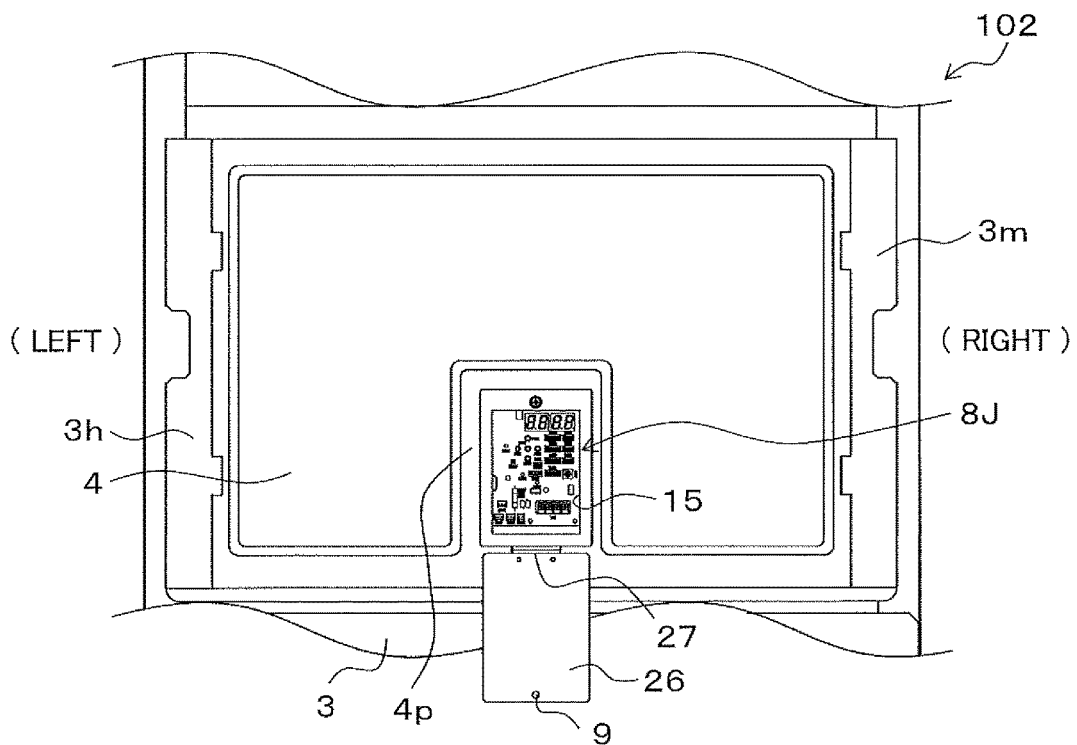
FIG. 8 is a front view that shows a periphery of an opening when an opening cover lid of an outdoor unit is opened according to a second modification.

FIG. 8 is a front view that shows the periphery of an opening 15 when an opening cover lid 26 of an outdoor unit 102 is opened according to a second modification.

In the outdoor unit 102 of the second modification, the weak current part 8J is mounted on the central lower end part of the electrical box cover panel 4.

In the second modification, the opening 15 through which the weak current part 8J is visually observed is provided on the central lower end part of the electrical box cover panel 4. A hinge 27 is provided at the central lower edge of the electrical box cover panel 4 disposed on the rear side with respect to the lower cabinet 3.

A configuration is employed in which the opening cover lid 26 is opened and closed vertically in a freely rotatable manner through the hinge 27, and is opened to be overlapped with the lower cabinet 3. Thereby, the opening cover lid 26 abuts on the lower cabinet 3 when the opening cover lid 26 is opened, and thus can be opened at a predetermined angle, which is 180 degrees or less, to the face 4p to which the electrical box cover panel 4 extends.

Accordingly, the opening cover lid 26 is prevented from being unintentionally left open.

<Third Modification>

Figure 9:
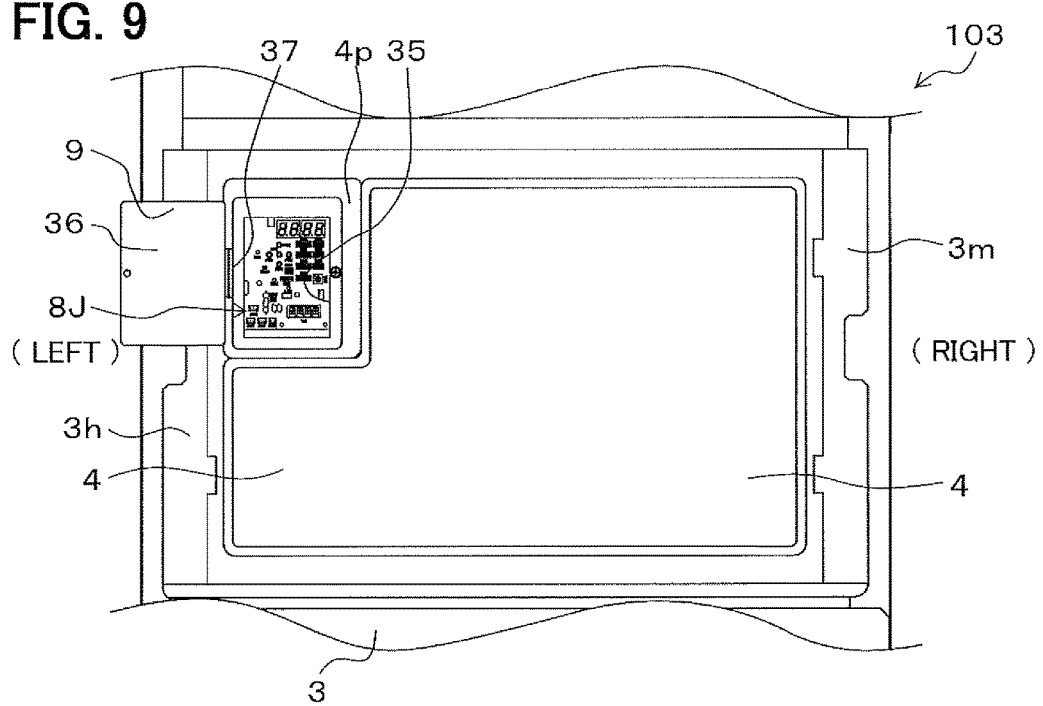
FIG. 9 is a front view of a periphery of an opening of an outdoor unit when an opening cover lid is opened according to a third modification.

FIG. 9 is a front view of the periphery of an opening 35 when an opening cover lid 36 of an outdoor unit 103 is opened according to a third modification.

In the outdoor unit 3 of the third modification, the weak current part 8J is mounted at the upper left end part of the electrical box cover panel 4.

In the third modification, an opening 35 through which the weak current part 8J is visually observed is provided on the upper left end part of the electrical box cover panel 4. A hinge 37 is provided at the upper left edge of the electrical box cover panel 4 disposed on the rear side with respect to the left cabinet 3h.

Further, a configuration is employed in which the opening cover lid 36 is freely opened and closed horizontally via a hinge 37 disposed at an upper left edge of the electrical box cover panel 4, and is opened to overlap the left cabinet 3h.

Thereby, the opening cover lid 36 abuts on the left cabinet 3h when the opening cover lid 36 is opened, and thus can be only opened at a predetermined angle, which is 180 degrees or less, to a face 4p to which the electrical box cover panel 4 extends.

Accordingly, the opening cover lid 36 is prevented from being unintentionally left open.

<Disposition of Opening 5 and Opening Cover Lid 6>

Next, a disposition will be given of the opening 5 and the opening cover lid 6 for opening and closing the opening 5 in the outdoor unit 100.

Figure 10:
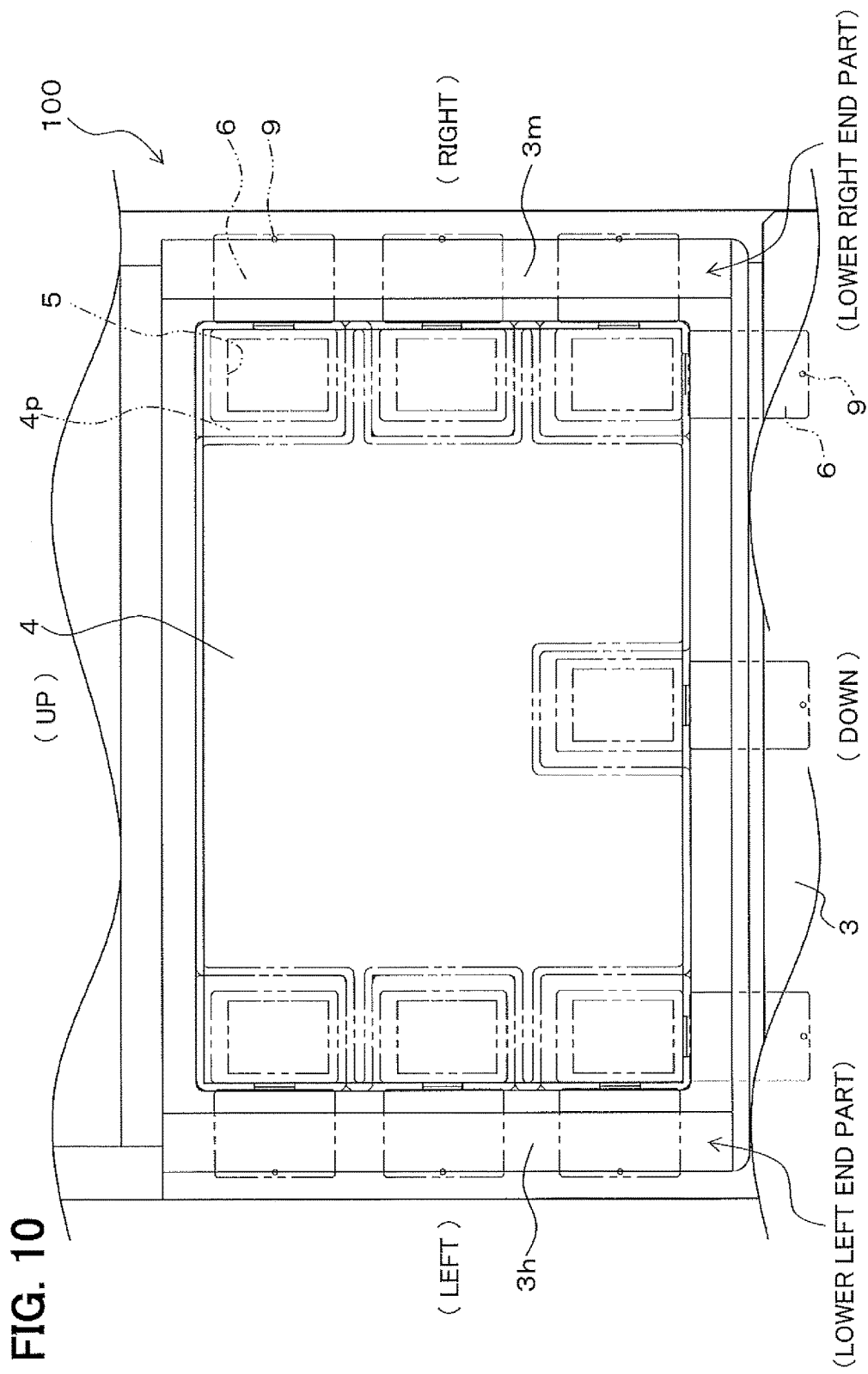
FIG. 10 is a diagram to summarize a plurality of dispositions of the opening and the opening cover lid for opening and closing the opening, in the outdoor unit.

FIG. 10 is a diagram to summarize a plurality of dispositions of the opening 5 and the opening cover lid 6 for opening and closing the opening, in the outdoor unit 100.

As illustrated in FIG. 10, the openings 5 and the opening cover lids 6 are disposed close to the lower end part, the right end part, or the left end part of the electrical box cover panel 4 according to the disposition of the weak current part 8J.

For example, when the opening 5 is disposed on the lower right end part of the electrical box cover panel 4, a configuration is employed in which the opening cover lid 6 is opened vertically around the hinge 7 disposed on the lower side thereof, and the opening cover lid 6 abuts on the lower cabinet 3 when the opening cover lid 6 is opened. Alternatively, a configuration may be employed in which the opening cover lid 6 is opened horizontally around the hinge 7 disposed on the right side thereof, and the opening cover lid 6 abuts on the right cabinet 3m, when the opening cover lid 6 is opened.

For example, when the opening 5 is disposed on the lower left end part of the electrical box cover panel 4, a configuration is employed in which the opening cover lid 6 is opened vertically around the hinge 7 disposed on the lower side thereof, and the opening cover lid 6 abuts on the lower cabinet 3 when the opening cover lid 6 is opened. Alternatively, a configuration may be employed in which the opening cover lid 6 is opened horizontally around the hinge 7 disposed on the left side thereof, and the opening cover lid 6 abuts on the left cabinet 3h when the opening cover lid 6 is opened.

For example, when the opening 5 is disposed on the central lower end part of the electrical box cover panel 4 except the lower left and right end parts thereof, a configuration is employed in which the opening cover lid 6 is opened vertically around the hinge 7 disposed on the lower side thereof, and the opening cover lid 6 abuts on the lower cabinet 3 when the opening cover lid 6 is opened.

For example, when the opening 5 is disposed on the right end part except the lower right end part of the electrical box cover panel 4, a configuration is employed in which the opening cover lid 6 is opened horizontally around the hinge 7 disposed on the right side thereof, and when the opening cover lid 6 is opened, the opening cover lid 6 abuts on the right cabinet 3m.

For example, when the opening 5 is disposed on the left end part except the lower left end part of the electrical box cover panel 4, a configuration is employed in which the opening cover lid 6 is opened horizontally around the hinge 7 disposed on the left side thereof, and when the opening cover lid 6 is opened, the opening cover lid 6 abuts on the left cabinet 3h.

Consequently, the opening 5 may be disposed at a position close to either of the left and right sides or the lower side of the electrical box cover panel 4 disposed on the rear side with respect to one of the left, right, and lower cabinets 3m, 3h, and 3. Further, FIG. 2 indicates a case in which the opening 5 is disposed at a position close to the lower right side of the electrical box cover panel 4.

As described above, since the opening 5 is provided on the left or right side, or lower side of the electrical box cover panel 4, a configuration is employed in which, when the opening cover lid 6 is opened the opening cover lid abuts on the left cabinet 3h, the right cabinet 3m, or the lower cabinet 3. Accordingly, a configuration is employed in which the housing cover 2 cannot be mounted on the front panel 1A of the housing 1 in a state of the opening cover lid 6 being open.

Further, since the hinge 7 is provided on either of the left and right sides or the lower side of the opening 5, a configuration is employed in which the opening cover lid 6 abuts on the left cabinet 3h, the right cabinet 3m, or the lower cabinet 3 when the opening cover lid 6 is open to prevent the housing cover 2 from being mounted on the front panel 1A of the housing 1.

Consequently, the opening 5 is arranged to allow the weak current part 8J of the control board to be easily accessed without removing the electrical box cover panel 4, and the opening cover lid 6 is mounted on the opening 5, to provide the outdoor unit 100 of the air conditioner that prevents the opening cover lid 6 from being unintentionally left open.

Other Embodiments

1. The description has been given of the embodiments by illustrating the configuration in which the weak current part 8J of the electrical box has the opening 5 and the opening cover lid 6, however, a configuration may be employed in which the strong current part and other regions of the electrical box other than the weak current part 8J have the opening 5 and the opening cover lid 6.

2. Further, the description has been given of the embodiments by illustrating the configuration in which the housing 1 has the opening 5 and the opening cover lid 6 provided on the front panel 1A thereof, however, the housing 1 may have the opening 5 and the opening cover lid 6 provided on right or left side panels or a rear panel thereof.

3. The description has been given of the embodiments by taking the sems washer 10 as an example of preventing the opening cover fixing screw 9 from the opening cover lid 6, however as far as a means has a function of preventing the opening cover fixing screw 9 from coming off the opening cover lid 6 when it is opened, a coming-off preventive member other than the sems washer 10 may be adopted. For example, a string plastic member maybe used to combine the opening cover lid 6 with the opening cover fixing screw 9. Thereby, the opening cover fixing screw 9 does not come off from the opening cover lid 6 when the opening cover lid 6 is opened, so that the additional work for searching for the opening cover fixing screw 9 can be eliminated to improve work efficiency.

4. An outdoor unit (100) of an air conditioner may include an electrical box, and a housing 1 that covers the electrical box to form an contour, a first cover member (2) that covers the electrical box and is mounted on the housing 1, a second cover member (6) that is mounted on an inner side of the first cover member (2), a work opening (5) that is opened and closed by the second cover member (6), wherein, if the first cover member (2) is about to be mounted on the housing 1 in a state of the second cover member (6) being open, the first cover member (2) abuts on the second cover member (6) to inhibit the first cover member (2) from being mounted.

According to this configuration, if the first cover member (2) is about to be mounted on the housing 1 in a state of the second cover member (2) being open, the first cover member (2) abuts on the second cover member (6) to inhibit the first cover member (2) from being mounted, thereby preventing the second cover member (6) from being unintentionally left open.

5. The embodiments or the like describe one example of the present invention as claimed in the appended claims, and different modifications and a specific embodiment may be made within the scope of the appended claims.

REFERENCE SIGNS LIST 1 housing
2 housing cover (first cover member)
3 lower cabinet
4 electrical box cover panel (electrical box cover member)
4p face to which electrical box cover panel extends (mounting face)
5 opening (work opening)
6 opening cover (second cover member)
7, 17, 27, 37 hinge (hinge)
8 control board
9 opening cover fixing screw (fixing member, fixing screw)
10 sems washer (coming-off preventive member)
100, 101, 102, 103 outdoor unit of air conditioner
θ1 predetermined angle

What is claimed is:

1. An outdoor unit of an air conditioner, comprising:
an electrical box;
a housing that covers the electrical box to form an contour;
an electrical box cover member that covers components inside the electrical box; and
a housing cover that covers the electrical box cover member from outside,
wherein the electrical box cover member includes a work opening and has an opening cover that covers the work opening, and wherein the housing cover abuts on the opening cover in a state of the opening cover being open.

2. The outdoor unit of the air conditioner according to claim 1,
wherein the electrical box cover member includes a hinge to which the opening cover is pivotably connected, and wherein the hinge is provided on either of left and right sides or a lower side of the work opening.

3. The outdoor unit of the air conditioner according to claim 1,
wherein the work opening is provided at a position close to a left end part, a right end part, or a lower end part of electrical box cover member.

4. The outdoor unit of the air conditioner according to claim 1,
wherein the electrical box cover member includes a hinge to which the opening cover is pivotably connected, wherein the hinge is provided on either of left and right sides or lower side of the work opening, and wherein the opening cover is provided so as to only open outward at a predetermined angle or less to a mounting face thereof.

5. The outdoor unit of the air conditioner according to claim 1, further comprising:
a mounting member that mounts the opening cover to the electrical box cover member; and
a coming-off preventive member that prevents the mounting member from coming off the opening cover when the opening cover is opened.

6. The outdoor unit of the air conditioner according to claim 1, further comprising:
a mounting screw that mounts the opening cover to the electrical box cover member; and
a screw falling-off preventive washer that prevents the mounting screw from falling off from the opening cover when the opening cover is opened.

7. An outdoor unit of an air conditioner, comprising:
an electrical box;
a housing that covers an electrical box to form an contour;
a first cover member that covers the electrical box and is mounted on the housing;
a second cover member that is mounted on an inner side of the first cover member; and
a work opening that is opened and closed by the second cover member,
wherein, if the first cover member is about to be mounted on the housing in a state of the second cover member being open, the first cover member abuts on the second cover member to inhibit the first cover member from being mounted.

* * * * *